UNITED STATES PATENT OFFICE.

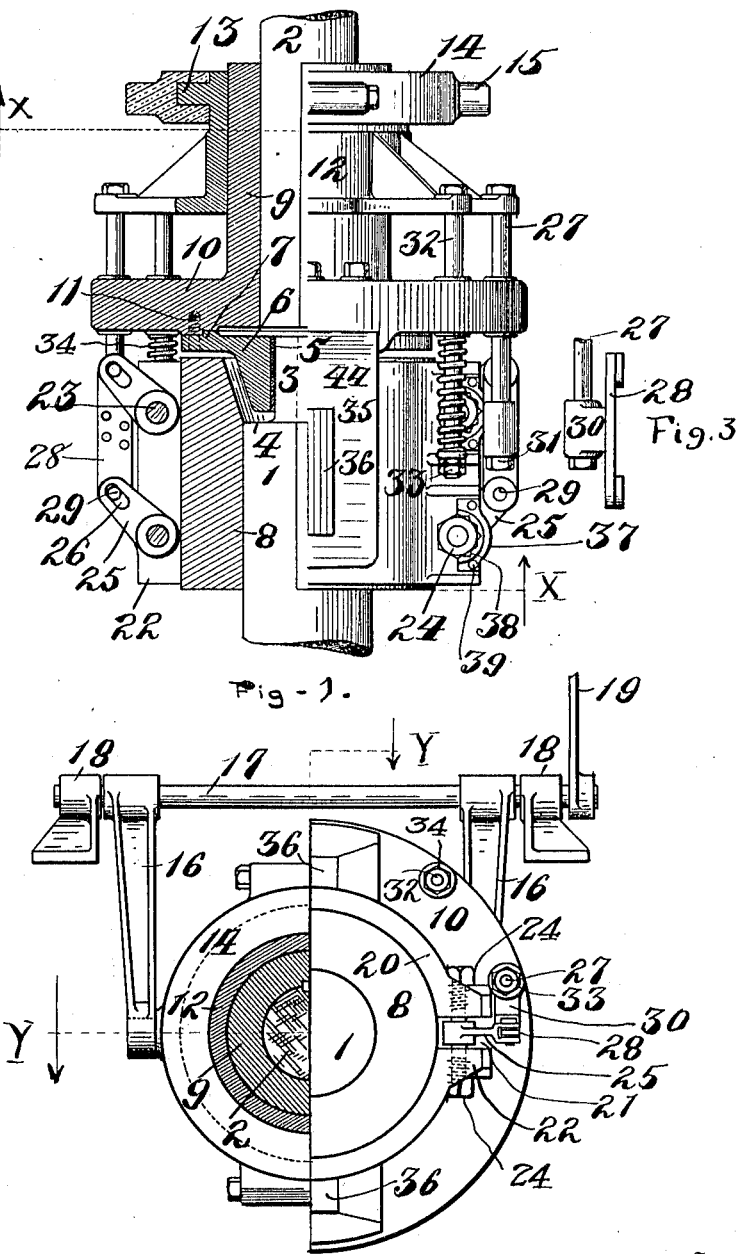

WILLIAM C. TYLER AND EDWARD NALL, OF AKRON, OHIO, ASSIGNORS TO THE GOODYEAR TIRE AND RUBBER COMPANY, OF AKRON, OHIO, A CORPORATION OF OHIO.

FRICTION-CLUTCH.

1,096,649. Specification of Letters Patent. Patented May 12, 1914.

Application filed July 5, 1913. Serial No. 777,488.

*To all whom it may concern:*

Be it known that we, WILLIAM C. TYLER and EDWARD NALL, citizens of the United States, residing at Akron, in the county of Summit and State of Ohio, have invented new and useful Improvements in Friction-Clutches, of which the following is a specification.

This invention relates to improvements in friction clutches and the object thereof is to provide a clutch for connecting the end of a driving to the end of a driven shaft when said shafts are in alinement.

The invention relates more specifically to providing means for establishing clutching relation between a driving and a driven member, the means being so arranged as not to twist the members out of alinement during the clutching operation and generally to provide an improved, quick-acting and reliable clutch for the purpose described.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a plan view, partially in section on line Y—Y of Fig. 2; Fig. 2, is an end elevation looking from the bottom in Fig. 1 and partially in section on line X—X of said figure; and, Fig. 3, is a side elevation of a detail of the mechanism employed.

Referring specifically to the drawings the reference numerals 1 and 2 denote respectively, the driving and the driven members, in this case shown as alined shafts. The end of the shaft 1 which is adjacent to the end of the shaft 2 is reduced at 3 to provide a shoulder 4. On the reduced portion 3 is a friction reducing bushing 5 surrounding which is a freely mounted hub 6 provided with a laterally-extending flange 7. Secured on the shaft 1 rearwardly from the shoulder 4 is a sleeve 8 referred to in the art as a "chill" which is provided with an enlarged opening at one end to freely inclose the hub 6. Fixedly secured on the shaft 2 by a key or otherwise is a sleeve 9. The inner end, by which is meant the end which opposes the end of the shaft 1, is provided with a radial collar 10 which is secured by screws 11 to the flange 7 of the hub 6 so as to rotate in unison therewith. Longitudinally-slidably mounted on the sleeve 9 is a shiftable head 12 provided near one end with an annular ridge 13 which receives a correspondingly interiorly-grooved collar 14 provided on opposite sides with nogs 15 to receive shifting levers 16 preferably mounted on a shaft 17 supported in bearings 18 and rocked through the medium of a lever 19 by which the arms 16 are caused to oscillate to shift the position of the head 12 longitudinally of the sleeve 9.

Briefly, the clutching operation is effected by clamping two clutching members about the sleeve or chill 8 and each of these clutching members comprises a member 20 semicircular in form and with the side edges of the two spaced apart at 21 and with the side edges of each of the members provided with laterally-projecting ribs 22 through which extend vertical apertures in alinement with each other for a purpose to be later described. There are generally two apertures in each rib 22 and extending freely in each of the apertures is a right and left hand screw 23 having nuts 24 applied to the ends thereof with the inner faces of the nuts bearing against the ribs 22. The adjustment of the members 20 with respect to the exterior of the sleeve or chill 8 is such that a very slight drawing together or movement of the members 20 will serve to clamp them snugly against the member 8 and effect clutching relation.

Secured centrally of each of the screws 23 is a radially-projecting arm 25 and with the outer ends of these arms provided with bifurcated portions, said bifurcated portions provided with vertically-alined slots 26. All of the arms 25 are adapted to be swung in unison by the following mechanism. Secured to the head 12 and arranged on opposite sides thereof are a pair of rods 27 which pass freely through suitable bearing-forming openings in the flange 10. Extending between bifurcated portions of the ends of arms 25 is an arm 28 on which are projecting pins 29 arranged to engage in the slots 26. These arms 28 are each provided with a longitudinal apertured lug 30 into which extends the free end of one of the rods 27 and which is held in place through the medium of a nut 31, so that as the head 12 is shifted by means of the oscillating clutch levers 16 the relative position of the arms 28 is changed accordingly, thereby oscillating the arms 25 and causing a rotation of the screws 23 to draw the members 20 inwardly or force them apart to cause them to establish or prevent clutching relation.

Secured to the head 12 and arranged parallel with the rods 27 are a pair of rods 32 passing through suitable apertures in the flange 10 which constitute bearings for this purpose. The free ends of these rods 32 are provided with nuts 33 and between the nuts and the flange 10 are a plurality of coiled resilient elements 34 the normal tendency of which is to shift the head in the direction of the shaft 1 to thereby release the parts from clutching engagement.

Secured on opposite sides of the flange 10 are longitudinally-extending members 44 provided with diametrically oppositely disposed openings 35 and extending in opposite directions from each of the members 20 are lugs 36 which extend into the openings 35 to thereby loosely couple the members 20 to the flange 10 to insure the rotation of the parts in unison.

In order to hold the nuts 24 from rotation in unison with the screws 23 when the arms 25 are oscillated we provide locking devices comprising semicircularly-formed plates 37 provided on their inner faces with a plurality of notches 38 for engagement with the various faces of the nuts 24 for holding them in a determined adjusted position, these plates being secured to the members 20 through the medium of pins 39.

The operation of the device is as follows:—The shaft 1 constituting the driving member is constantly rotating and the chill 8 revolves therewith. When the lever 19 is operated to oscillate the arm 16 the head 12 is shifted away from the driving shaft 1 thereby oscillating the arms 25 and rotating the screws 23 to draw the two members 20 tightly against the outer face of the chill 8 to establish clutching relation, in doing which sufficient force is employed to overcome the normal resistance of the springs 34. When it is desired to terminate clutching relation or prevent the same, the lever 19 is rocked to move the head 12 toward the driving shaft 1 and the force necessary for this operation is reduced by reason of the assistance of the springs 34.

We claim:—

1. A clutch embodying a driving and a driven shaft, one of said shafts having a reduced end, a sleeve inclosing the reduced end of said shaft and the contiguous end of the other shaft for holding said members in alinement, a pair of radially-moving clutch members inclosing one shaft, a right and left hand screw arranged when rotated to establish clutching relation between said members and one shaft, an oscillating arm on said screw, means carried by the other shaft for shifting said arm for rotating said screw to set up clutching engagement.

2. In clutch mechanism, the combination of a driving and a driven shaft, a sleeve on one shaft, an inclosing element on the opposite member, said sleeve and inclosing member coupled together to constitute means for holding said shafts in alinement, a pair of radially-acting clutch members adapted to establish clutching engagement with one shaft, a right and left handed screw carried by said clutch members and arranged when rotated to establish clutching relation, shiftable means on the other shaft connected with said clutch mechanism and arranged when shifted to rotate said right and left hand screw for throwing said clutch into and out of operation.

3. The combination of a pair of shafts, a sleeve connecting said shafts for holding them in alinement, a head shiftable on said sleeve, a pair of radially-acting clamping members arranged to establish clutching engagement with one shaft, a right and left hand screw engaging said clamping members, an oscillatory arm on said screw, and means connected with said head and arranged when said head is shifted to rotate said right and left handed screw for inducing clutching relation between said clamping members and one of said shafts.

4. The combination with a pair of shafts arranged in alinement, one of said shafts provided at its end with a reduced portion, a freely rotatable flanged member mounted on said reduced portion, a flanged sleeve on the other shaft, and connected with said flanged member, a head shiftable on said sleeve, a pair of semi-circularly-formed clutch members surrounding one shaft, the edges of said semi-circular members spaced apart, a right and left handed screw adapted to establish clutching engagement with one shaft and move said members into and out of clutching operation when rotated, an oscillatory arm connected with said right and left handed screw, and means connecting said oscillatory arm and said head whereby when said head is shifted the clutching operation is induced or terminated.

In testimony whereof we have hereunto set our hands in presence of two subscribing witnesses.

WILLIAM C. TYLER.
EDWARD NALL.

Witnesses:
R. M. LEMIEUX,
A. J. GILHOOLY.

Copies of this patent may be obtained for five cents each, by addressing the "Commissioner of Patents, Washington, D. C."